United States Patent
Joubert et al.

(10) Patent No.: US 7,550,968 B2
(45) Date of Patent: Jun. 23, 2009

(54) MEASUREMENT OF WALL THICKNESSES PARTICULARLY OF A BLADE, BY EDDY CURRENTS

(75) Inventors: Pierre-Yves Joubert, Paris (FR); Yann Le Bihan, Malakoff (FR); Olivier Lespinet, Corbeil Essonnes (FR); Aleksandra Mikic, La Garenne Colombes (FR)

(73) Assignees: SNECMA, Paris (FR); CNRS, Paris (FR)

( * ) Notice: Subject to any disclaimer, the term of this patent is extended or adjusted under 35 U.S.C. 154(b) by 128 days.

(21) Appl. No.: 11/739,972

(22) Filed: Apr. 25, 2007

(65) Prior Publication Data

US 2008/0111543 A1 May 15, 2008

(30) Foreign Application Priority Data

Apr. 26, 2006 (FR) .................................. 06 51493

(51) Int. Cl.
*G01B 7/06* (2006.01)
(52) U.S. Cl. ..................................... 324/229
(58) Field of Classification Search ................. 324/202, 324/225, 228, 229, 234, 239, 240; 702/57, 702/155, 170
See application file for complete search history.

(56) References Cited

U.S. PATENT DOCUMENTS 4,924,182 A * 5/1990 Vernon et al. ................ 324/237
6,552,536 B2 * 4/2003 Trantow ...................... 324/222
6,806,703 B2 * 10/2004 Le Bihan et al. ............ 324/229
7,019,519 B2 * 3/2006 Le ............................... 324/230

FOREIGN PATENT DOCUMENTS

| EP | 1 167 917 A1 | 1/2002 |
|---|---|---|
| WO | WO 98/02714 | 1/1998 |
| WO | WO 03/073040 A2 | 9/2003 |

OTHER PUBLICATIONS

Yann Le Bihan, 3-D Finite-Element Analysis of Eddy-Current Evaluation of Curved Plates, IEEE Transactions on Magnetics, vol. 38, No. 2, Mar. 2002, pp. 1161-1164.*
Y. Le Bihan, et al., "Wall thickness evaluation of Single-crystal hollow blades by eddy current sensor", NDT&E International, vol. 34, No. 5, XP-004249269, Jul. 2001, pp. 363-368.

* cited by examiner

*Primary Examiner*—Kenneth J Whittington
(74) *Attorney, Agent, or Firm*—Oblon, Spivak, McClelland, Maier & Neustadt, P.C.

(57) ABSTRACT

A method for evaluating the wall thickness of a hollow part, of the turbomachine blade type, at least at a point having a determined radius of curvature at this point, within determined ranges of radii of curvature and thicknesses, including the determination of impedance values of an electrical circuit formed by an eddy current detector applied to the wall, and the insertion of these values into a digital processing unit with a neural network, wherein the network parameters have been defined in advance by learning on spacers having a determined radius of curvature and thickness in the ranges.

11 Claims, 1 Drawing Sheet

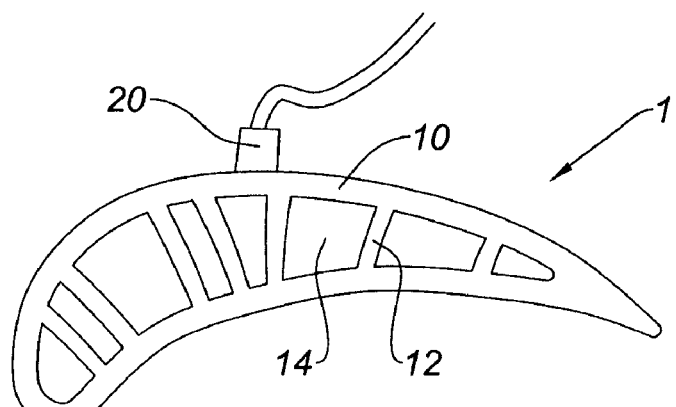
Fig. 1
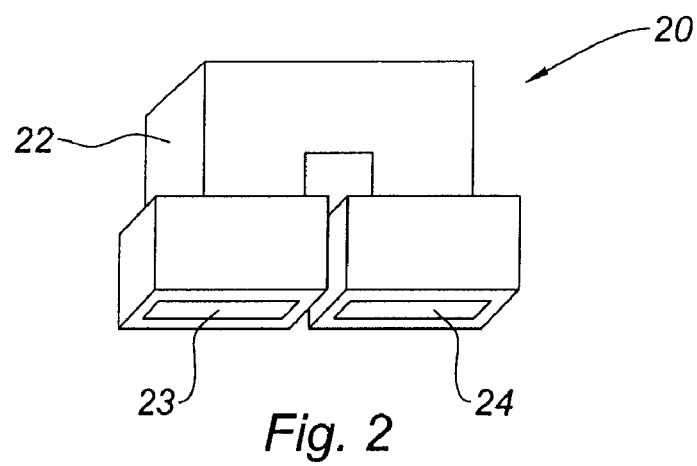
Fig. 2
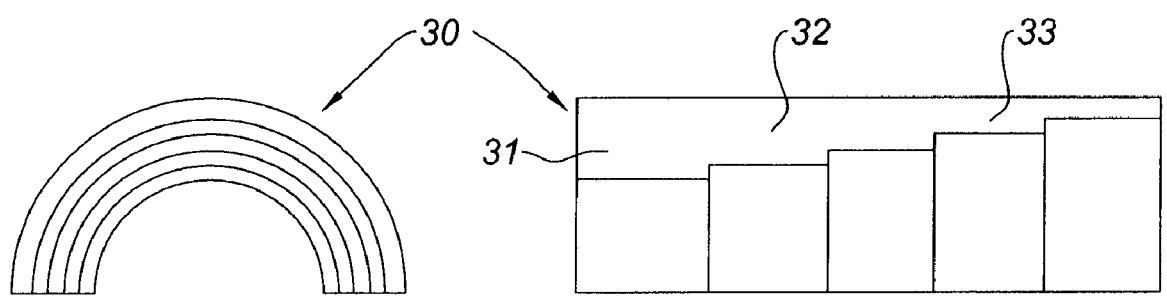
Fig. 3
Fig. 4

MEASUREMENT OF WALL THICKNESSES PARTICULARLY OF A BLADE, BY EDDY CURRENTS

The present invention relates to the field of turbomachines and has as its subject a device for measuring wall thicknesses of hollow parts such as blades, particularly of a turbine, by eddy currents.

BACKGROUND OF THE INVENTION

High pressure turbine blades have increasingly complex geometries particularly with internal channels for cooling them by air circulation, internal partitions and a curvature called variable. After manufacture, the thickness of the outer walls in line with the channels must be evaluated by a non-destructive method in order to ensure their mechanical strength. The uncertainty of the measurement must be low. For example, for wall thicknesses ranging from 0.3 to 1.2 mm an uncertainty of less than 25 micrometers is set.

DESCRIPTION OF THE PRIOR ART

A known method is X-ray tomography. However, its operating time has the disadvantage of being long. The inspection of a complete blade would require making successive sections of several minutes each at several heights. Such a solution cannot be envisaged for a systematic inspection and still less if the required measurement accuracies were not met.

Another method, by ultrasound, is not suitable either because the measurements are greatly disrupted by the anisotropy of the material—the accuracy objectives would not be achieved—and by its manual character. It is also subject to variability factors such as the experience of the operator, calibration and reproducibility.

The measurement technique by eddy currents is well suited for such an application, that is to say for a part made of single-crystal material, and meets the intended objectives of measurement accuracy. In particular, the conductivity of the materials at ambient temperature is not influenced by the crystalline orientation. However, account must be taken of the geometric characteristics particular to this type of part, because several parameters disrupt the measurement:

the local curvature of the blade,
the presence of partitions close to the point of measurement, and
the relative positioning between the detector and the part.

The latter point may be solved by the use of a mechanical structure of sufficiently reliable precision.

The present applicant has already developed a measurement means making it possible to suppress the disruptions induced by the presence of the partitions. An appropriate U-shaped magnetic detector has been produced that emits in a preferred direction. Patent application EP 1167917 relates to a method for measuring the thickness of a hollow blade wall consisting in applying two magnetic poles of an eddy current detector to the wall in alignment parallel with the partitions, the poles being furnished with coils connected together in series, in moving the detector on the wall perpendicularly to the partitions, in recording a signal generated by the detector and in deducing therefrom the thickness of the wall according to preliminary calibrations. The latter are carried out based on measurements on specimen walls comprising partitions. Furthermore these calibrations are used in the learning of a neural network. This neural network, once properly programmed by this learning, provides an evaluation of the thickness of the wall when an input signal is applied to it, as provided by the detector and corresponding to the measured impedance.

An artificial neural network is a digital computer-operated computation model inspired by the operation of real biological neurons. As is specified in the abovementioned patent application, it consists of neurons linked together via inputs and outputs. An artificial neuron N is more precisely an individual processor linked to one or more inputs e with which weightings W are associated and to a single output s. The output value depends on the weighted inputs and a bias b, according to the formula $s=f(w.e+b)$ where f is an activation function determined by the programming of the neuron N. So the data travel in the network being modified at each neuron that they traverse. The neurons are distributed in successive layers and chained with the neurons of the previous and subsequent layer.

The model used in the above application consists of an output layer C2 with a single neuron providing the desired output, the thickness, and a hidden layer C1 consisting of several neurons supplied by impedance values, resistance and/or reactance, obtained from the signal provided by the eddy current detector. The functions operated by the neurons are the identity for C2: $f(w.e+n)=w.e+b$; and the hyperbolic tangent: $f(w.e+b)=\tanh(w.e+b)$ in the layer C1.

The learning is carried out on a spacer comprising a plate formed of parallel strips of increasing thickness and furnished at the rear with ribs analogous to the partitions. The eddy current detector is applied to this spacer to obtain specimen signals corresponding to the impedances, and from which the parameters, weighting and bias, of the neural network are defined and adjusted. The learning can be carried out by appropriate algorithms so that the network outputs the known thickness at each point of the spacer according to the signals provided by the detector.

However, there remains a final factor that must be taken account of in the case of a part having severe curvatures: an air gap is formed between the flat surface of the detector and the curved surface of the part that disrupts the measured signal; it would be desirable to be able to dispense with this.

SUMMARY OF THE INVENTION

The applicant has now set itself the objective of developing a method capable of taking the curvature effect into account.

According to the invention, the method for evaluating the wall thickness of a hollow part, with a curved surface, of the turbomachine blade type, at least at a point having a determined radius of curvature at this point, particularly within determined ranges of radii of curvature and thicknesses, comprising the determination of impedance values of an electrical circuit formed by an eddy current detector applied to the wall, and the insertion of these values into a digital processing unit of the neural network type is characterized by the fact that the parameters of the neural network have been defined in advance by learning on spacers having determined radii of curvature in the range of the radii of curvature of said surface and determined thicknesses.

The invention applies in particular to the evaluation of the wall thickness of a turbomachine blade whose radius of curvature is greater than or equal to 10 mm and less than 100 mm with a curvature that may be concave or convex depending on whether the sensor is on the pressure side or on the suction side of the blade.

According to a further feature, the method is applied to the evaluation of the wall thickness of turbomachine blades, said thickness lying in the range 0.1 mm and 2 mm.

In order to have to avoid making corrections that would be a function of the nature of the material, said spacers are preferably of the same material as the blade.

According to another feature, the method being applied to a part such as a turbomachine blade having internal partitions, a detector is used having a U-shaped magnetic core of which each branch is provided with a measurement coil. More particularly, the branches of the core have a spacing at least equal to that of said partitions.

BRIEF DESCRIPTION OF THE DRAWINGS

The invention is now described in greater detail with reference to the appended drawings in which:

FIG. 1 is a view in section of a turbomachine blade provided with internal channels for the circulation of a cooling fluid, FIG. 2 shows an example of a detector used for measuring the wall thickness by eddy currents, FIGS. 3 and 4 show an example of a spacer used for the learning of the neural network, seen respectively from the front and in profile section.

FIG. 1 represents a hollow blade 1 whose outer wall 10 is curved and which comprises internal partitions 12 defining, in particular between them and the walls, cooling air circulation channels 14. The disposition and thickness are not the same from one partition to the other. Many configurations are possible. The same applies to the curvature of the wall that varies more or less both along the chord of the airfoil and between the root and its free end. As has been explained above, it is important to be able to know at every point the thickness of the blade wall when it has been manufactured by molding.

The method of the invention aims to measure or at least allow an evaluation of the thickness of the walls 10 at every point, by applying the eddy current measurement method. This method consists in creating an electrical circuit with an alternating current generator, an appropriate detector 20 and a voltmeter for recording the voltage generated at the terminals of the detector. The detector is placed against the wall which influences the impedance of the electrical circuit. The values measured by the voltmeter depend, through the impedance of the circuit, on the eddy currents that the electromagnetic induction of the detector coils generates on the adjacent portion of the part. They therefore depend on the characteristics of the wall. These values are then processed in order to evaluate the thickness therefrom.

The detector 20 used is preferably of the type shown in FIG. 2, and already used in the method described in patent application EP 1167917 in the name of the present applicant. It comprises a U-shaped high-permeability magnetic core 22, and with a square or rectangular section. Two coils 23 and 24 are placed on the branches of the core and are electrically connected in series. The detector therefore emits in a preferred direction and the effect of the partitions is therefore reduced.

The width of the magnetic circuit between the two poles is close to or greater than the width of the partitions. The detector 20 is moved on an ad hoc basis to the measurement points and the line formed by the two U-shaped poles is kept parallel to the direction of the partitions.

The structure of the sensor with its U-shaped magnetic circuit makes it possible to generate a magnetic field essentially parallel to the line formed by the two poles of the "U". As emerges from the teaching of the above patent, by orienting, at each measurement point, the two poles of the sensor parallel to the partitions, a signal is thereby obtained that is not disrupted very much by the partitions because the eddy currents are then orthogonal to the partitions and do not penetrate the latter very much. On the other hand, an orthogonal alignment causes high sensitivity to the partitions. In this instance, this sensor is used preferably in its "parallel" mode. If necessary, the accuracy of the estimate is improved by having curved spacers with partitions as explained below.

Tests were carried out with a sensor with square poles 1 mm by 1 mm, with an inter-pole spacing of 1 mm.

It will however be observed that, because the present invention applies to determining thicknesses of walls having a certain radius of curvature but not necessarily underlying partitions, the use of any other detector is also included in the context of the invention.

To ensure a sweep of all the measurement points and the perpendicularity of the detector, with precision and reliability relative to the surface to be measured, the detector is preferably supported by a multiple-axis, particularly five-axis, mechanical structure. Sweeping is advantageously point by point. At each point, the signal is recorded and then the detector is moved to the next measurement point.

If the voltage measured by the voltmeter is V and the intensity of the current passing through the coils is I, this then gives the relation $Z_0=V_0/I_0+R_0+jX_0$ where $Z_0$ is the impedance, $R_0$ the resistance and $X_0$ the reactance of the circuit in the absence of the part and $j^2=-1$. In the same way $Z_c=V_c/I_c=R_c+jX_c$ when the detector is applied to the part.

The thickness is estimated by a digital processing means with inverse model. "Inverse model" means a mathematical model that very generally links the consequence to the cause unlike a direct model that goes from the cause to the consequence. In the present application, the inverse model supplies the wall thickness (the cause) from the impedance (which is a consequence of the thickness, and of other parameters of the blade). This type of model is known for solving problems of estimating parameters based on measurements. It may be created by means of a database as is done in this instance. This model has as its input data the impedance of the detector, preferably the standardized impedance, and as its output the estimated thickness.

The inverse model is therefore a mathematical function, advantageously a neural network or a polynomial model whose parameters are set based on eddy current data originating from measurements made on spacers that cover the ranges of thickness and curvature that are sought.

FIGS. 3 and 4 show a spacer 30 used for the learning of the neural network. The spacer 30 has the shape of a portion of a cylinder, a semi-cylinder particularly, with a circular section whose radius figures a radius of curvature and that has been chosen within the range of the radii of curvature of the blade. The wall of the spacer is formed of a plurality of thicknesses 31, 32, 33, etc. The thickness increases by level along its axis. The thicknesses are also chosen according to the range of thicknesses to be measured. The spacers are used in the concave and convex positions. Advantageously, the material forming the spacers is the same as that of the parts to be measured or at least of the same conductivity. However, there is nothing to prevent the measurements being made on spacers having a conductivity different from the parts. Specifically, the standardized impedance, as defined in the above patent, depends only on σ and f in the form of a product. An error in conductivity may then be compensated for by modifying the acquisition frequency on the spacer relative to that subsequently used on the part.

The neural network learning proceeds by measuring values according to the impedance of the circuit in which the detector is incorporated; this circuit is modified by the eddy currents generated in the part which themselves depend on the thicknesses of the spacers. Knowing the thicknesses of the spacers makes it possible to deduce therefrom the values of the network parameters via an appropriate iterative algorithm. This algorithm is based, for example, on computing the error gradient between the thickness provided by the neural network and the actual thickness of the spacer at the measurement point in question.

The sensor taken with an alignment parallel to the partitions has a low sensitivity to the latter. It is therefore not essential to have spacers having partitions in order to calibrate the sensor. The use of spacers of semicylindrical shape is therefore sufficient. Spacers with partitions, for example blades appropriately cut up and characterized metrologically, however, make it possible to increase the accuracy of measurement if necessary. The inverse model learns and corrects at least partially the effect of the partitions that is small but nonzero. To further improve performance, the sensor is used with an alignment orthogonal to the partitions to complement the preceding mode. It allows the neural network, thanks to the very different influence of the partitions in these two modes, to identify and correct the effect of the partitions after calibration on curved spacers with partitions.

The invention claimed is:

1. A method for evaluating the thickness of a wall of a hollow part, with a curved surface, of a turbomachine blade, at least at a point having a determined radius of curvature and thickness at said point, comprising:
   providing a semicylindrical spacer having a determined radius of curvature in the range of the radii of curvature of said surface and a thickness that varies along the longitudinal axis of said semicylindrical spacer,
   determining impedance values of an electrical circuit formed by an eddy current detector applied to the wall, and
   entering said impedance values into a digital processing unit of a neural network, wherein parameters of the neural have been defined in advance by learning on said semicylindrical spacer.

2. The method as claimed in claim 1, wherein the thickness of the wall of the turbomachine blade has a radius of curvature that is greater than or equal to 10 mm and less than 100mm with a curvature that may be concave or convex.

3. The method as claimed in claim 2, wherein said thickness is in a range from 0.1 mm to 2 mm.

4. The method as claimed in claim 1, wherein said spacers are of the same material as the blade.

5. The method as claimed in claim 1, wherein said spacers are not of the same material as the blade, and further comprising a step of correcting the effect of a difference in electrical conductivity being applied.

6. The method as claimed in claim 1, wherein the turbomachine blade has internal partitions, whereby the eddy current detector has a U-shaped magnetic core of which each branch is provided with a measurement coil.

7. The method as claimed in claim 6, wherein the branches of the core have a spacing at least equal to that of said partitions.

8. The method as claimed in claim 1, wherein the thickness of the semicylindrical spacer increases by levels along the longitudinal axis of the semicylindrical spacer.

9. The method as claimed in claim 1, wherein the semicylindrical spacer has a plurality of partitions.

10. The method as claimed in claim 9, wherein the partitions are characterized metrologically.

11. The method as claimed in claim 10, wherein the step of determining said impedance values is performed by aligning said eddy current detector orthogonally with respect to partitions of the turbomachine blade.

* * * * *